(12) United States Patent
Visenzi

(10) Patent No.: US 8,919,158 B2
(45) Date of Patent: Dec. 30, 2014

(54) INTEGRATED SYSTEM FOR THE OPENING AND CLOSING OF A SUITCASE FOR MOTORCYCLES AND FOR HOOKING AND RELEASING SUCH A SUITCASE WITH RESPECT TO THE MORTORCYCLE

(75) Inventor: Giuseppe Visenzi, Brescia (IT)

(73) Assignee: Givi S.R.L. Unipersonale, Flero (IT)

( * ) Notice: Subject to any disclaimer, the term of this patent is extended or adjusted under 35 U.S.C. 154(b) by 37 days.

(21) Appl. No.: 13/823,163

(22) PCT Filed: Oct. 18, 2011

(86) PCT No.: PCT/IB2011/054629
§ 371 (c)(1),
(2), (4) Date: Mar. 14, 2013

(87) PCT Pub. No.: WO2012/052919
PCT Pub. Date: Apr. 26, 2012

(65) Prior Publication Data
US 2013/0168427 A1 Jul. 4, 2013

(30) Foreign Application Priority Data

Oct. 19, 2010 (IT) .............................. MI2010A1913

(51) Int. Cl.
*A45C 13/10* (2006.01)
*B62J 7/02* (2006.01)
*B62J 9/00* (2006.01)

(52) U.S. Cl.
CPC ..... *B62J 7/02* (2013.01); *B62J 9/00* (2013.01)
USPC .................. 70/69; 224/418; 224/430

(58) Field of Classification Search
CPC ............. E05B 65/52; B62J 9/001; B62J 9/00; G07C 9/00896; G07C 9/00087
USPC ....................... 70/69; 224/418, 419, 430, 431
See application file for complete search history.

(56) References Cited

U.S. PATENT DOCUMENTS

| | | | | |
|---|---|---|---|---|
| 887,430 | A | * | 5/1908 | Salviola ............................ 70/74 |
| 3,795,354 | A | * | 3/1974 | Stippich ........................ 224/418 |
| 5,438,853 | A | * | 8/1995 | Bartsch ............................. 70/69 |
| 5,461,892 | A | * | 10/1995 | Hsieh ............................... 70/73 |
| 5,579,971 | A | * | 12/1996 | Chuang ......................... 224/430 |
| 5,881,584 | A | * | 3/1999 | Brunoski et al. .................. 70/68 |

(Continued)

FOREIGN PATENT DOCUMENTS

| | | |
|---|---|---|
| EP | 1 063 157 | 12/2000 |
| EP | 2 186 715 | 5/2010 |
| WO | 2009/101470 | 8/2009 |

*Primary Examiner* — Suzanne Barrett
(74) *Attorney, Agent, or Firm* — Jacobson Holman Hershkovitz, PLLC.

(57) ABSTRACT

An opening/closing and hooking/releasing system of a suitcase for motorcycles is described, provided with a lower shell and an upper shell. On the bottom portion of the lower shell reversible hooking means to a support plate fixed to the motorcycle are provided. On the lower shell a plaque is made integral, on which are obtained a first release button of the suitcase with respect to the support plate, a second opening button of the upper shell and a locking block. The first and the second buttons are mobile along a predetermined direction. A rotatable under-locking ring is rigidly constrained to the locking block, said ring being provided with a pair of counterposed protruding teeth and able to rotate in support on the side wall to shift from a first simultaneous blocking position of the first and second buttons to a second simultaneous release position of such first and second button.

9 Claims, 6 Drawing Sheets

(56) References Cited

U.S. PATENT DOCUMENTS

| | | | |
|---|---|---|---|
| 6,095,473 A * | 8/2000 | Engers | 248/339 |
| 6,443,344 B1 * | 9/2002 | Nicosia et al. | 224/413 |
| 7,207,470 B2 * | 4/2007 | Akita et al. | 224/413 |
| 8,292,139 B2 * | 10/2012 | Golub et al. | 224/419 |
| 2013/0240584 A1 * | 9/2013 | Nagayoshi et al. | 224/413 |

* cited by examiner

INTEGRATED SYSTEM FOR THE OPENING AND CLOSING OF A SUITCASE FOR MOTORCYCLES AND FOR HOOKING AND RELEASING SUCH A SUITCASE WITH RESPECT TO THE MORTORCYCLE

CROSS-REFERENCE TO RELATED APPLICATIONS

This is a national stage of PCT/IB11/054629 filed Oct. 18, 2011 and published in English, which has a priority of Italian no. MI2010A 001913 filed Oct. 19, 2010, hereby incorporated by reference.

BACKGROUND OF THE INVENTION

The present invention refers to a system capable of both opening and closing a suitcase for motorcycles, and to obtain the hooking and releasing of such a suitcase with respect to a fixed portion of the motorcycle.

It is well known to use, on motorcycles in general, cases, bags or suitcases suitable for housing luggage, helmets or other accessories. Such suitcases are usually applied to the rear part of the motorcycle and normally comprise a special support plate, which is stably fixed to the motorcycle itself, and systems for hooking such a support plate. The hooking systems are usually of the removable type and are provided in the bottom portion of the suitcase, which can be made either from plastic material, or from metal material.

Hooking systems normally comprise a sliding lock bolt element, able to engage with a special protrusion provided on the support plate so as to stably constrain the suitcase to the plate itself. A button release mechanism, possibly equipped with a safety lock, makes it possible to retract the lock bolt so as to release the suitcase from the relative support plate.

A suitcase for motorcycles equipped with a system capable of both opening and closing the suitcase itself, and to obtain its hooking and releasing with respect to a fixed portion of the motorcycle, is described, for example, in patent application n. EP-A-2242677 to the same Applicant. Such a suitcase, however, although being strong and easy to open, is equipped with opening/closing and hooking/releasing mechanisms that are rather complex. Patent application n. EP-A-2186715, on the other hand, describes an opening/closing and hooking/releasing system of a suitcase for motorcycles according to the preamble of the following claim 1.

The purpose of the present invention is therefore that of obtaining a system capable of both opening and closing a suitcase for motorcycles, and to obtain the hooking and releasing of such a suitcase with respect to a fixed portion of the motorcycle, which is able to solve the aforementioned drawbacks of the prior art in an extremely simple, cost-effective and particularly functional manner.

In detail, one purpose of the invention is that of obtaining an integrated system for opening and closing a suitcase for motorcycles, as well as for hooking and releasing such a suitcase with respect to the motorcycle, which is simplified and provided with a smaller number of components with respect to systems according to the prior art.

Another purpose of the invention is that of obtaining an integrated system for opening and closing a suitcase for motorcycles, as well as for hooking and releasing such a suitcase with respect to the motorcycle, which is strong, reliable and simple to use.

These purposes according to the present invention are achieved by producing an integrated system for opening and closing a suitcase for motorcycles, as well as for hooking and releasing such a suitcase with respect to the motorcycle, as outlined in claim 1.

Further characteristics of the invention are highlighted by the dependent claims, which are an integral part of the present description.

BRIEF DESCRIPTION OF THE SEVERAL VIEWS OF THE DRAWINGS(S)

The characteristics and the advantages of an integrated system for opening and closing a suitcase for motorcycles, as well as for hooking and releasing such a suitcase with respect to the motorcycle, according to the present invention shall become clearer from the following description, given as an example and not for limiting purposes, with reference to the attached schematic drawings, in which.

DETAILED DESCRIPTION OF THE INVENTION

Figure 1:
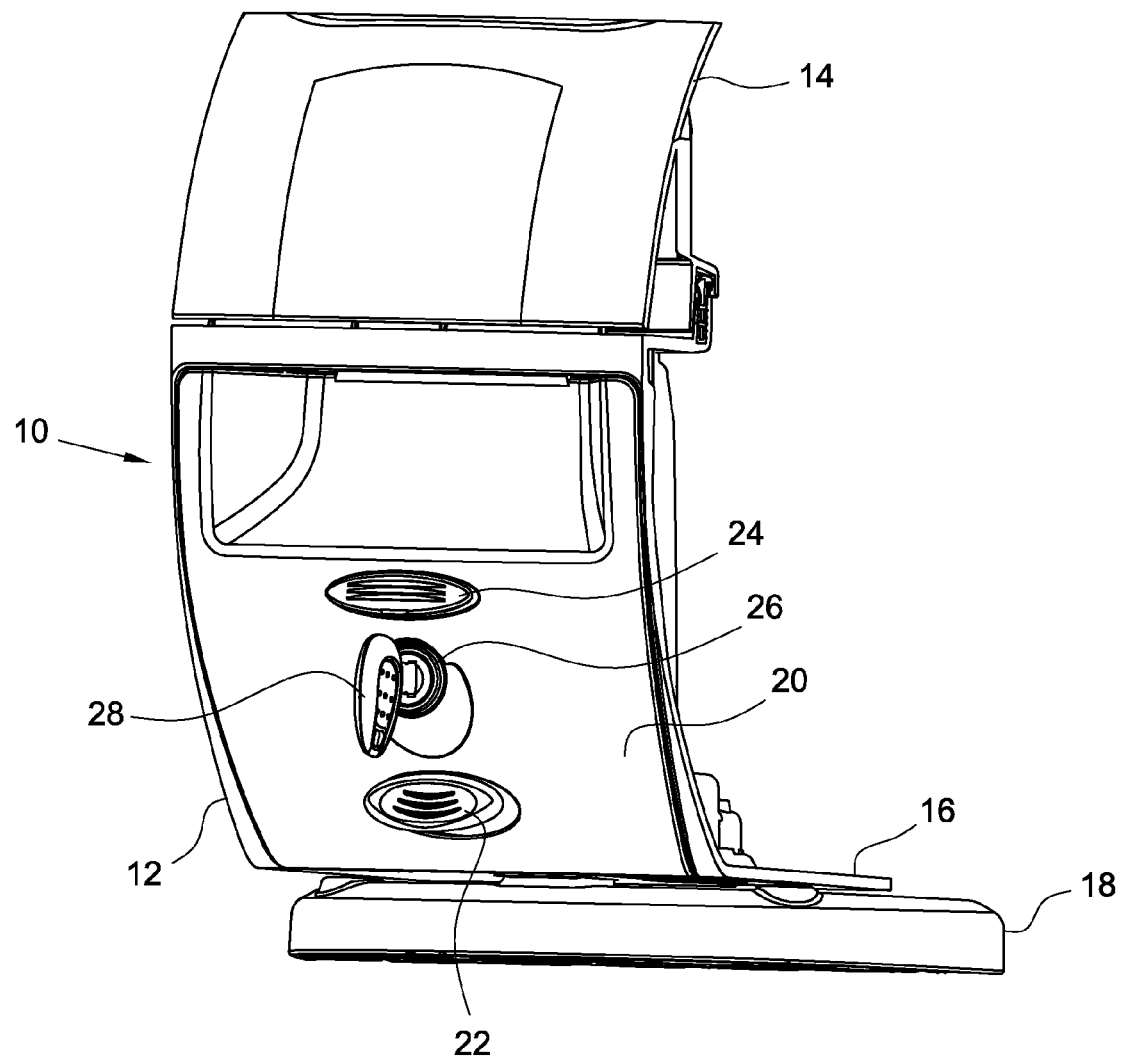
FIG. 1 is a perspective view of a portion of suitcase and of a relative support plate to which the opening/closing and hooking/releasing system according to the invention can be applied.

With reference to the figures, the components belonging to an opening/closing and hooking/releasing system of a suitcase 10 for motorcycles, according to the present invention, are shown. By "suitcase" it is meant any type of container equipped with a body and with a cover which are mutually hinged. In particular, the opening/closing and hooking/releasing system according to the invention can be applied to a so-called case of the rigid type, formed by a lower shell 12, that forms the body of the case 10 itself, and by an upper shell 14, that forms the cover and that is hinged at the rear to the lower shell 12.

On the bottom portion 16 of the lower shell 12 are provided reversible hooking means to a support plate 18 fixed to the motorcycle. Such reversible hooking means, which are per se known, shall be described more in detail in the rest of the description.

On the external surface of the lower shell 12, in a position which can be easily accessed by the user, a plaque 20 is thus made integral on which there are all the opening/closing means of the case 10 and the hooking/releasing means of such a case 10 with respect to the support plate 18 that is fixed to the motorcycle. In greater detail, such opening/closing and hooking/releasing means comprise a first release button 22 of the case 10 with respect to the support plate 18 fixed to the motorcycle, a second opening button 24 of the cover 14 and a locking block 26 with a key 28. The two buttons 22 and 24 are mobile with a rectilinear motion along a direction that is substantially perpendicular to the extension direction of one of the side walls 58 of the lower shell 12.

Figure 2:
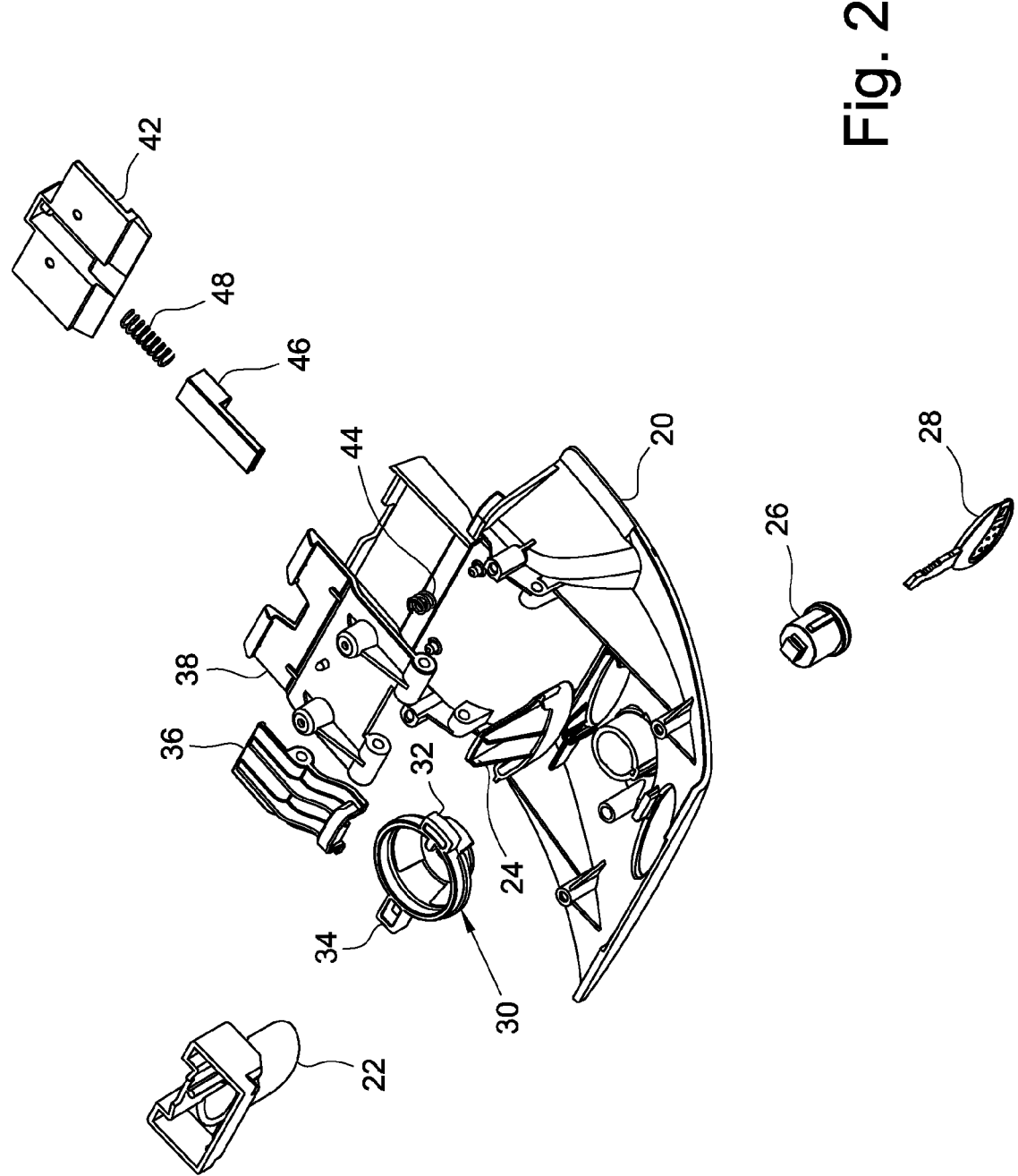
FIG. 2 is an exploded view of the components of the opening/closing and hooking/releasing system according to the invention.
Figure 3:
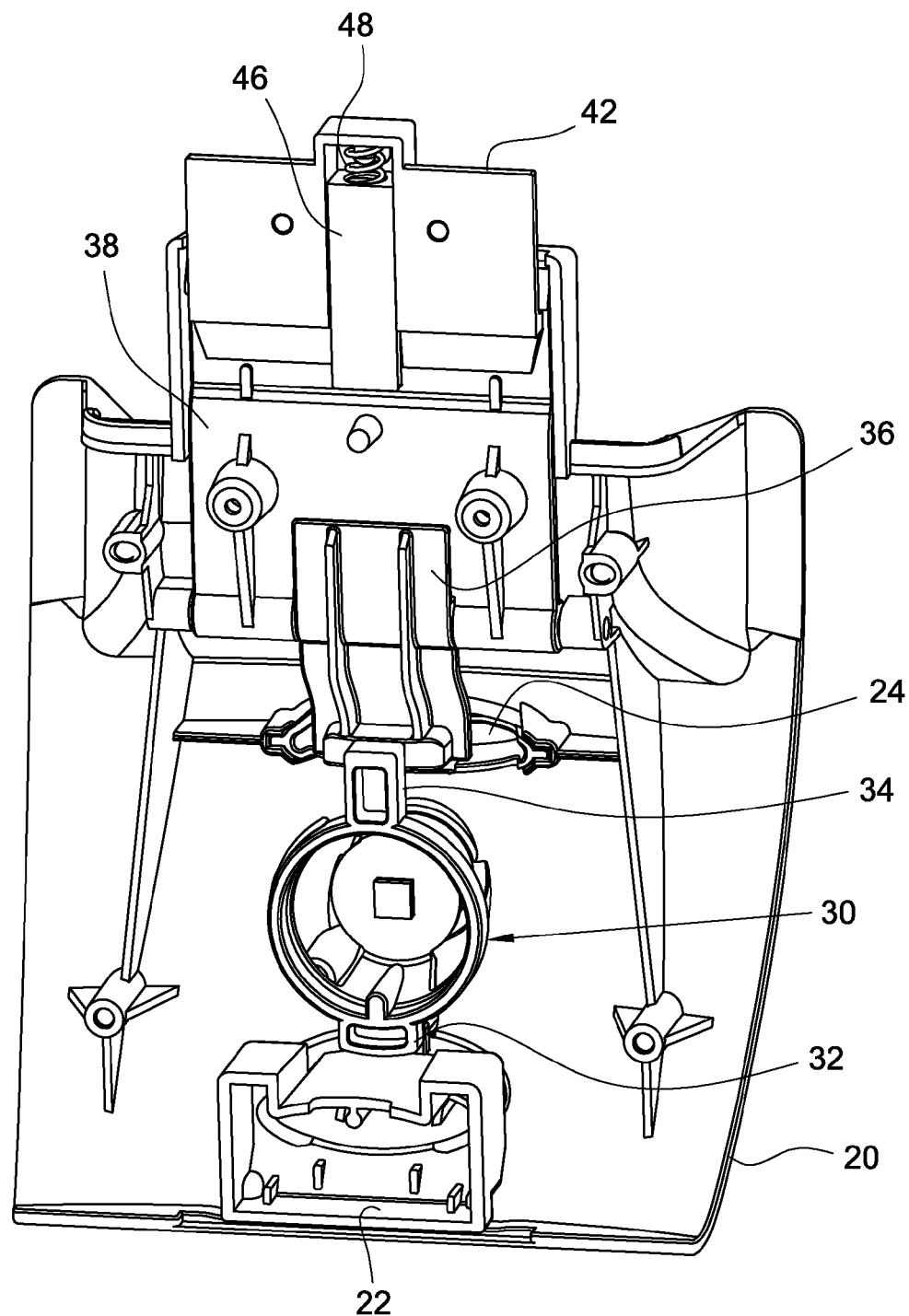
FIG. 3 is a perspective view, obtained from inside of the suitcase, of the opening/closing and hooking/releasing system according to the invention.

As shown in the exploded view of FIG. 2, a rotatable under-locking ring 30 is rigidly constrained to the locking block 26, said ring being provided with a pair of counterposed protruding teeth 32 and 34. The under-locking ring 30, once actuated by the key 28, is able to rotate in support on the side wall 58 of the lower shell 12, to shift from a first simultaneous blocking position of the rectilinear motion and of the first button 22, and of the second button 24, to a second simultaneous release position of the rectilinear motion of such two buttons 22 and 24.

The second opening button 24 of the cover 14 is operatively connected to an intermediate lever 36, in turn operatively connected to a hooking rocker element 38. Both the intermediate lever 36 and the hooking rocker element 38 are hinged around a pin 40 made integral with the plaque 20. The hooking rocker element is thus able to selectively engage with a corresponding hooking means 42 which is integral with the cover 14, as shall be specified in greater detail in the rest of the description. At least one spring 44, constrained to the plaque 20 on one side and to the hooking rocker element 38 on the other side, operates by compression to maintain such a hooking rocker element 38 in the hooking or closed position of the cover 14 with respect to the lower shell 12.

Elastic means including a pre-opening slider 46 and at least one pre-opening spring 48 can be provided for pushing between the cover 14 and the lower shell 12 of the case 10, so as to increase the displacement of the cover 14 from such a lower shell 12 in the releasing or opening position. In particular, in the embodiment shown in the figures, the cover 14 is equipped with a pre-opening slider 46 that is pushed to elastically protrude from the edge of the cover 14 itself by means of at least one pre-opening spring 48, so as to react against the corresponding edge of the lower shell 12 of the case 10. In greater detail, the pre-opening spring 48 is constrained to the hooking means 42 integral with the cover 14 on one side and with the pre-opening slider 46 on the other side. In such a way the opening movement of the cover 14 is facilitated.

Figure 4:
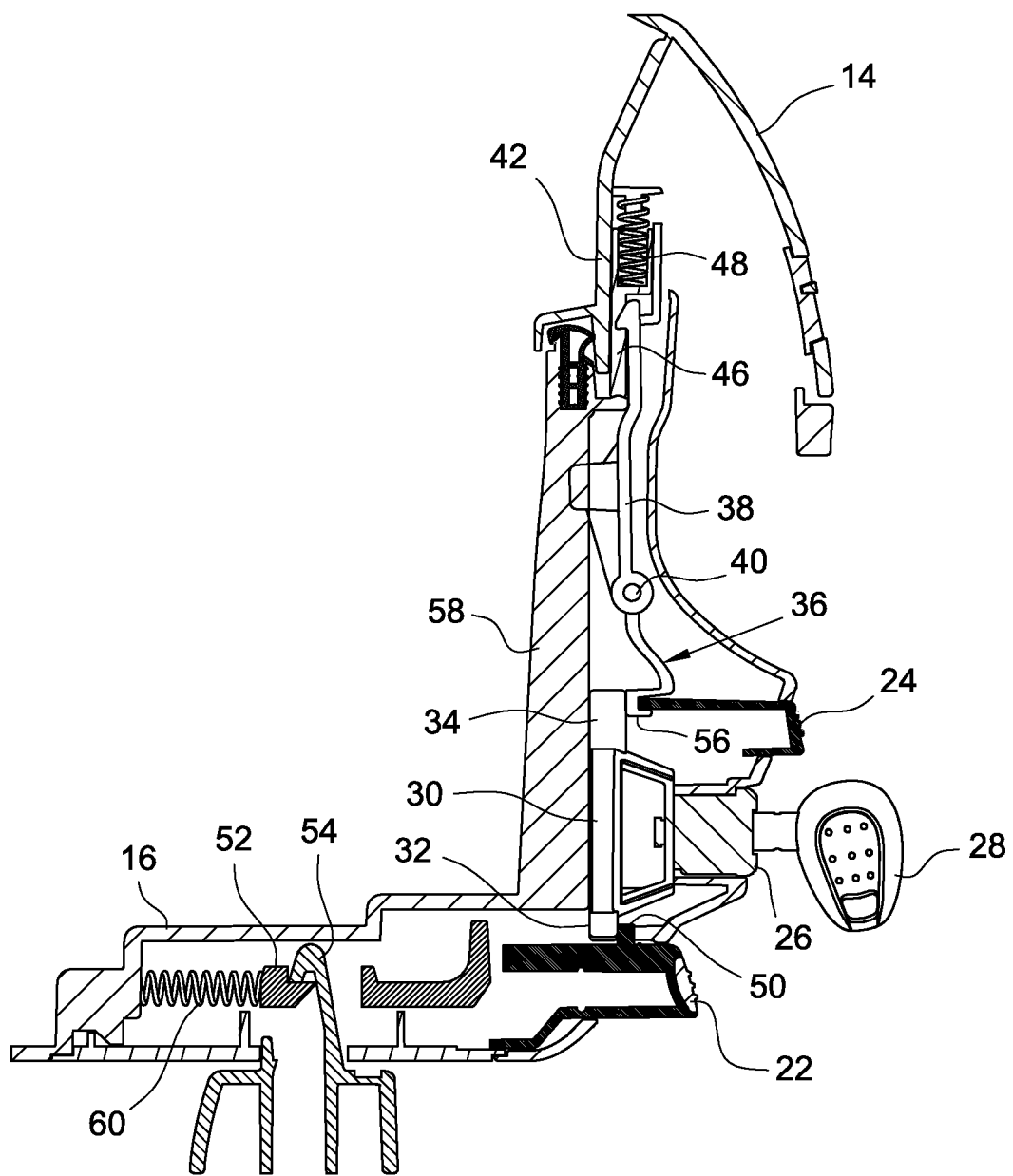
FIG. 4 is a section view of the opening/closing and hooking/releasing system according to the invention, shown in the closed configuration of the suitcase and in the hooked configuration of such a suitcase with respect to the relative support plate.

FIG. 4 shows a section view of the opening/closing and hooking/releasing system according to the invention in the closed configuration of the case 10 and hooked configuration of such a case 10 with respect to the relative support plate 18. Such a configuration, in which both the simultaneous closure of the case 10 and its hooking with respect to the relative support plate 18 is obtained, is ensured by the presence of the rotatable under-locking ring 30, which operates in the following manner.

The first protruding tooth 32 of the rotatable under-locking ring 30 is engaged with a corresponding tooth 50 formed in a single piece with the first release button 22 of the case 10 with respect to the support plate 18. In such a way the first button 22, not being able to slide with a rectilinear motion towards the inside of the case 10, cannot move a latch that remains engaged with a hooking prong 54 belonging to the reversible hooking means of the support plate 18. Consequently, the case 10 cannot be released from the support plate 18 made integral with the motorcycle.

Simultaneously, the second protruding tooth 34 of the rotatable under-locking ring 30 is positioned between the lower end 56 of the intermediate lever 36 and the side wall 58 of the lower shell 12. In such a way, since all these components are "packed" against one another, it is not possible to move the second opening button 24 of the cover 14 along a rectilinear direction, and, consequently, a movement cannot be transmitted to the hooking rocker element 38, which therefore keeps the condition in which the case 10 is closed.

Figure 5:
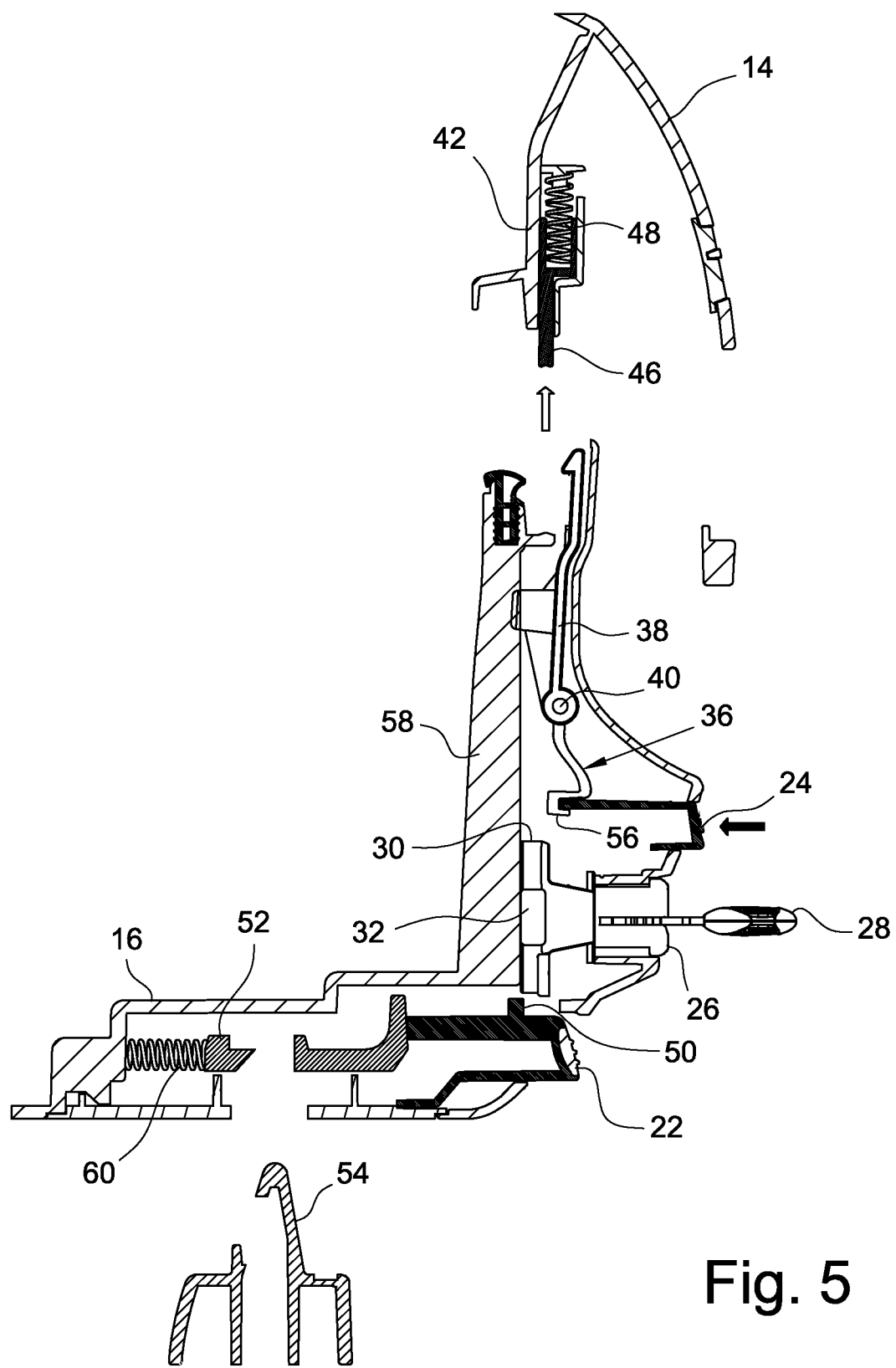
FIG. 5 is another section view of the opening/closing and hooking/releasing system according to the invention, shown in the opened configuration of the suitcase and in the released configuration of such a suitcase with respect to the relative support plate.
Figure 7:
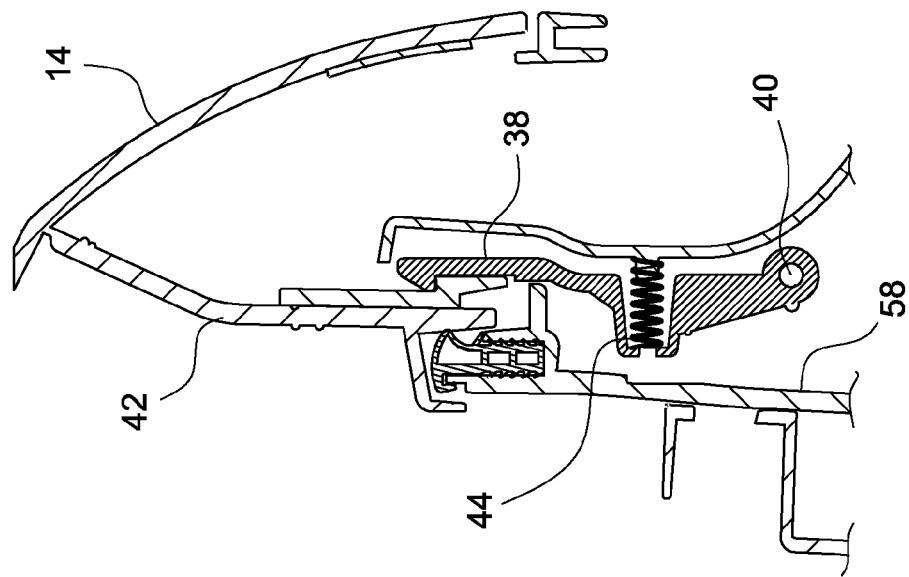
FIG. 7 is a section view of a detail of the opening/closing and hooking/releasing system shown in the configuration of FIG. 6.

In order to be able to release the case 10 from the support plate 18 and open it, it is necessary to act on the key 28 of the locking block 26, making it rotate by 90°. Since the rotatable under-locking ring 30 is rigidly constrained to the locking block 26, such an under-locking ring 30 also rotates by 90° and is placed in the releasing position visible in FIG. 5, where it can be noted that the tooth 50 of the first button 22 and the lower end 56 of the intermediate lever 36 are no longer engaged with the first protruding tooth 32 and the second protruding tooth 34 of the rotatable under-locking ring 30, respectively. In this condition it is both possible to release the case 10 from the support plate 18, and to open the cover 14.

By exerting a force in the rectilinear movement direction of the first button 22 a horizontal movement generates, towards the inside of the case 10, of such a first button 22 that, in turn, moves the latch 52 in the same direction. The latch 52 thus disengages from the hooking prong 54, making it possible to detach the case 10 from the support plate 18. Once the action on the first button 22 has finished, thanks to the action of a spring 60 which operates by compression along the rectilinear movement direction of such a first button 22, the latch 52 and the first button 22 itself automatically return to their initial position, so that the case 10 is ready to be hooked again to the relative support plate 18.

In the same way, by exerting a force in the rectilinear movement direction of the second button 24, and being the latter constrained to the intermediate lever 36, a rotation of such an intermediate lever 36 around its pin 40 is generated. The rotation of the intermediate lever 36 in turn generates the rotation of the hooking rocker element 38, until it is disengaged from the corresponding hooking means 42 of the cover 14 and actually allowing the opening of such a cover 14 with respect to the lower shell 12.

The disengagement between the hooking rocker element 38 and the corresponding hooking means 42 of the cover 14 also allows the pre-opening slider 46 to act upon the lower shell 12, pushing upwards such a cover 14 under the action of the pre-opening spring 48. In such a way the opening of the case 10 is made more visible and more practical.

Once the force action on the second button 24 has finished, the hooking rocker element 38, under the reaction of the spring 44, returns to its initial position, in turn taking back into the initial position also the intermediate lever 36 to which it is operatively connected.

In order to re-close the case 10, irrespective of whether the key 28 is in the closed or opened position, it is sufficient to exert a certain pressure on the cover 14 to exceed the elastic force of the pre-opening spring 48. In such a way the retraction of the pre-opening slider 46 is achieved until the hooking rocker element 38 engages with the corresponding hooking means 42 of the cover 14.

Figure 6:
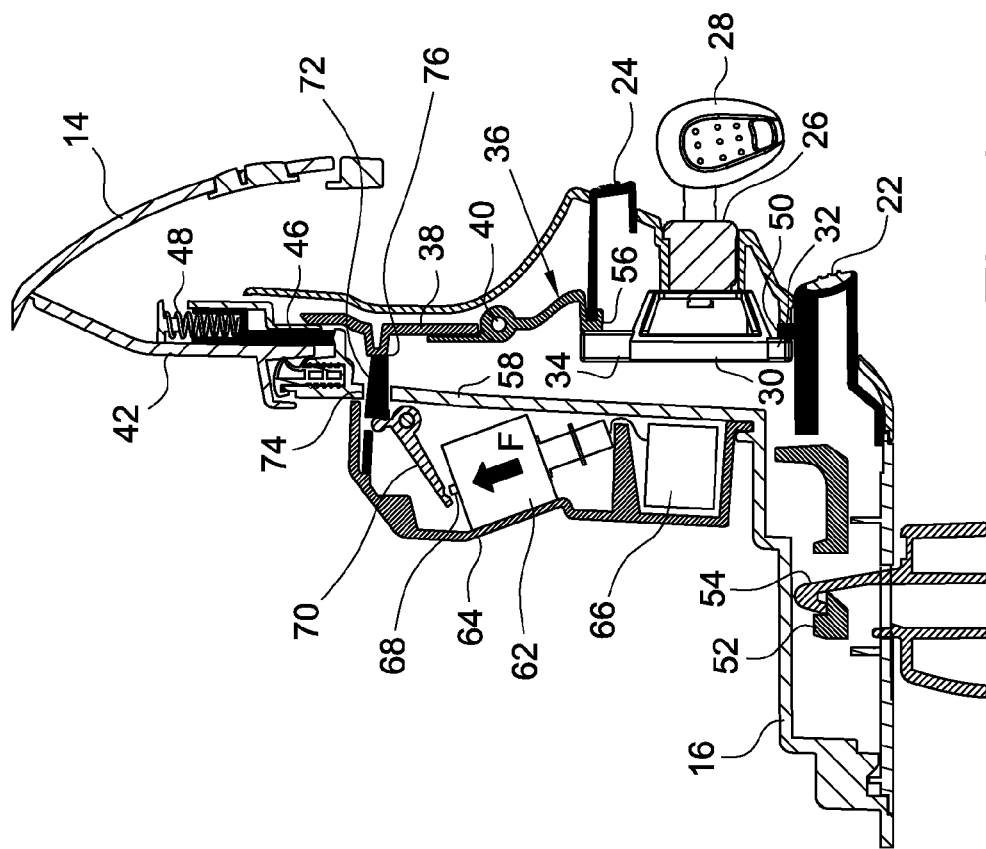
FIG. 6 is a further section view of the opening/closing and hooking/releasing system according to the invention, in which an advantageous implementation of such a system is illustrated.

FIG. 6 shows a variant embodiment of the opening/closing and hooking/releasing system according to the invention, comprising an electromagnetic actuator 62 housed in a suitable seat 64 provided inside the lower shell 12 of the case 10. The electromagnetic actuator 62 is controllable by means of a remote control (not shown).

Once a suitable electrical control pulse has been received, a receiving electric circuit 66 housed in the seat 64 feeds the electromagnetic actuator 62. The passage of current generates the movement, in the direction of the arrow F, of a mobile rod 68 of the electromagnetic actuator 62. By moving with rectilinear motion, the mobile rod 68, causes the rotation of a cam 70 inserted in the seat 64 and hinged to the side wall 58 of the lower shell 12. In turn, the rotation of the cam 70 causes the rectilinear motion of a slider 72 which, passing through a hole 74 made on the side wall 58 of the lower shell 12, goes into abutment against a cylindrical projection 76 integral with the hooking rocker element 38. The impact of the slider 72 on the cylindrical projection 76 causes the rotation of the hooking rocker element 38 around the relative pin 40, until the disengagement from the hooking means 42 integral with the cover 14 is obtained. It is then possible to obtain the opening of such a cover 14 with respect to the lower shell 12.

The movement of the mobile rod 68 of the electromagnetic actuator 62 is managed electronically for a duration of around 0.5 seconds. At the end of this time period the mobile rod 68 returns to its initial position, retracted in the electromagnetic actuator 62, and also the hooking rocker element 38, under the action of the spring 44, returns in position preparing to close again.

The opening with electromagnetic actuator 62 can occur when the under-locking ring 30 is both in its first blocking position, and in its second release position of the rectilinear motion of the second opening button 24 of the cover 14. The slider 72 is indeed able to make the hooking rocker element 38 to rotate irrespective of the position of the under-locking ring 30, which directly blocks the movement of the intermediate lever 36 but not the movement of the hooking rocker element 38.

The electromagnetic actuator 62 can be supplied with power without distinction through batteries or by the 12 Volt power taken directly from the battery of the motorcycle through a special connection system. The electrical impulse for controlling the opening can be provided in various ways, for example through radio waves or infrared radiation.

It has thus been seen that the integrated system for opening and closing a suitcase for motorcycles, as well as for hooking and releasing such a suitcase with respect to the motorcycle, according to the present invention achieves the purposes previously highlighted.

The integrated system for the opening and the closure of a suitcase for motorcycles, as well as for hooking and releasing such a suitcase with respect to the motorcycle, of the present invention thus conceived can, in any case, undergo numerous modifications and variants, all covered by the same inventive concept; moreover, all the details can be replaced by technically equivalent elements. In practice the materials used, as well as the shapes and sizes, can be any according to the technical requirements.

The scope of protection of the invention is thus defined by the attached claims.

The invention claimed is:

1. An opening/closing and hooking/releasing system of a suitcase for motorcycles provided with a lower shell, that forms a body of the suitcase, and an upper shell, that forms a cover and is hinged to the lower shell, on a bottom portion of the lower shell being provided reversible hooking means to a support plate fixed to the motorcycle, on an external surface of the lower shell a plaque being made integral on which are obtained a first release button of the suitcase with respect to the support plate, operatively connected to said reversible hooking means, a second opening button of the upper shell, operatively connected to hooking means hinged to the plaque and able to selectively engage with a corresponding hooking means integral with the upper shell, and a locking block, said first button being mobile with a rectilinear motion along a direction substantially perpendicular to an extension direction of one of side walls of the lower shell, to the locking block being rigidly constrained a rotatable under-locking ring, provided with a pair of counter-posed protruding teeth, wherein said second button is mobile with a rectilinear motion along a direction substantially perpendicular to the extension direction of one of the side walls of the lower shell, said rotatable under-locking ring being able to rotate in support on said side wall to shift from a first simultaneous blocking position of the rectilinear motion of said first and second buttons to a second simultaneous release position of the rectilinear motion of said first and second button, wherein said hooking means hinged to said plaque comprise an intermediate lever operatively connected to a hooking rocker element, both the intermediate lever and the hooking rocker element being hinged around a pin integral with said plaque, the hooking rocker element being then able to selectively engage with the corresponding hooking means integral with said upper shell.

2. The opening/closing and hooking/releasing system according to claim 1, wherein a first protruding tooth of the rotatable under-locking ring is able to engage, in said first hooking position, with a corresponding tooth integral with the first button which, not being able to slide with a rectilinear motion towards the inside of the suitcase, cannot move a latch that remains engaged with a hooking prong belonging to said reversible hooking means.

3. The opening/closing and hooking/releasing system according to claim 2, wherein a second protruding tooth of the rotatable under-locking ring is positioned, in said first blocking position, between the lower end of the intermediate lever and the side wall of the lower shell, so that it is impossible to move the second button along a rectilinear direction and, consequently, a movement cannot be transmitted to the hooking rocker element, which therefore keeps the suitcase in a closing condition.

4. The opening/closing and hooking/releasing system according to claim 1, also comprising at least one spring constrained to the plaque from one side and to the hooking rocker element from the other side, said at least one spring operating by compression to maintain said hooking rocker element in the hooking or closing position of the upper shell.

5. The opening/closing and hooking/releasing system according to claim 1, also comprising pushing elastic means between the upper shell and the lower shell, so as to increase the displacement of said upper shell from said lower shell in the releasing or opening position.

6. The opening/closing and hooking/releasing system according to claim 5, wherein said pushing elastic means comprise a pre-opening slider that is pushed to elastically protrude from an edge of the upper shell by means of at least one pre-opening spring, so as to react against the corresponding edge of the lower shell, said at least one pre-opening spring being constrained to the hooking means integral with the upper shell from one side and to said pre-opening slider from the other side.

7. The opening/closing and hooking/releasing system according to claim 1, also comprising an electromagnetic actuator housed in a suitable seat provided inside the lower shell and controllable to act on at least one of the hooking means hinged to the plaque, to move it to the releasing or opening position of the upper shell.

8. The opening/closing and hooking/releasing system according to claim 7, wherein the electromagnetic actuator comprises a rod movable with a rectilinear motion, able to cause the rotation of a cam inserted in the seat, the rotation of said cam causing in turn the rectilinear motion of a slider able to act on said at least one of the hooking means hinged to the plaque, to move it to the releasing or opening position of the upper shell.

9. The opening/closing and hooking/releasing system according to claim 7, wherein the electromagnetic actuator is controllable by means of a remote control actuating a receiving electric circuit, housed in the seat, able to feed said electromagnetic actuator.

\* \* \* \* \*